United States Patent
Inui et al.

(10) Patent No.: US 11,982,538 B2
(45) Date of Patent: May 14, 2024

(54) PASSAGE DIRECTION DETECTING DEVICE

(71) Applicant: AISIN CORPORATION, Kariya (JP)

(72) Inventors: Yoji Inui, Kariya (JP); Masaki Furukawa, Kariya (JP); Masataka Yamamoto, Kariya (JP)

(73) Assignee: AISIN CORPORATION, Aichi (JP)

( * ) Notice: Subject to any disclaimer, the term of this patent is extended or adjusted under 35 U.S.C. 154(b) by 171 days.

(21) Appl. No.: 17/336,485

(22) Filed: Jun. 2, 2021

(65) Prior Publication Data

US 2021/0396536 A1 Dec. 23, 2021

(30) Foreign Application Priority Data

Jun. 19, 2020 (JP) .................. 2020-106185

(51) Int. Cl.
*G01C 21/36* (2006.01)
*G06V 20/56* (2022.01)

(52) U.S. Cl.
CPC ....... *G01C 21/3602* (2013.01); *G06V 20/588* (2022.01)

(58) Field of Classification Search
CPC ............. G01C 21/3602; G06V 20/586; G06V 20/588; B60W 2552/53
See application file for complete search history.

(56) References Cited

U.S. PATENT DOCUMENTS

2018/0345955 A1\* 12/2018 Kim .................. B60R 1/00
2020/0041287 A1   2/2020 Tagawa et al.

FOREIGN PATENT DOCUMENTS

| DE | 10 2014 111 012 A1 | 2/2016 | |
| EP | 2982572 B1 \* | 9/2018 | ......... B62D 15/0285 |
| JP | 2018-176910 A | 11/2018 | |
| WO | 2017/170979 A1 | 10/2017 | |

OTHER PUBLICATIONS

Translation of Blinkle reference (Year: 2015).\*

\* cited by examiner

*Primary Examiner* — Kenneth J Malkowski
(74) *Attorney, Agent, or Firm* — Sughrue Mion, PLLC (57) ABSTRACT

A passage direction detecting device includes: a detection processing unit that detects a passage direction in which a passage connected to an exit of a parking area of a vehicle extends and the vehicle has to travel after exiting from the parking area, based on a road surface marking provided on a road surface to illustrate the parking area.

6 Claims, 10 Drawing Sheets

PASSAGE DIRECTION DETECTING DEVICE

CROSS REFERENCE TO RELATED APPLICATIONS

This application is based on and claims priority under 35 U.S.C. § 119 to Japanese Patent Application 2020-106185, filed on Jun. 19, 2020, the entire content of which is incorporated herein by reference.

TECHNICAL FIELD

This disclosure relates to a passage direction detecting device.

BACKGROUND DISCUSSION

In the related art, a technique has been known by which an exit path is calculated based on information regarding an obstacle existing on the periphery when a vehicle exits from a parking area. In such a technique of the related art, a passage direction in which a passage connected to an exit of the parking area extends and the vehicle has to travel after exiting from the parking area may be detected with reference to other vehicles existing in adjacent parking areas, and an exit path may be calculated based on the passage direction.

An example of the related art includes JP 2018-176910A.

However, since the sizes, the shapes, the parking methods, or the like of the other vehicles as obstacles existing in the adjacent parking areas are not always consistent, as in the above-described technique of the related art, when the passage direction is detected with reference to the other vehicles, an appropriate passage direction may not be calculated.

A need thus exists for a passage direction detecting device which is not susceptible to the drawback mentioned above.

SUMMARY

A passage direction detecting device as an aspect of this disclosure includes: a detection processing unit that detects a passage direction in which a passage connected to an exit of a parking area of a vehicle extends and the vehicle has to travel after exiting from the parking area, based on a road surface marking provided on a road surface to illustrate the parking area.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment and modification examples disclosed here will be described with reference to the drawings. Configurations of the embodiment and the modification examples to be described below and the effects brought about by the configurations are merely examples, and are not limited to the following contents.

Embodiment

Figure 1:
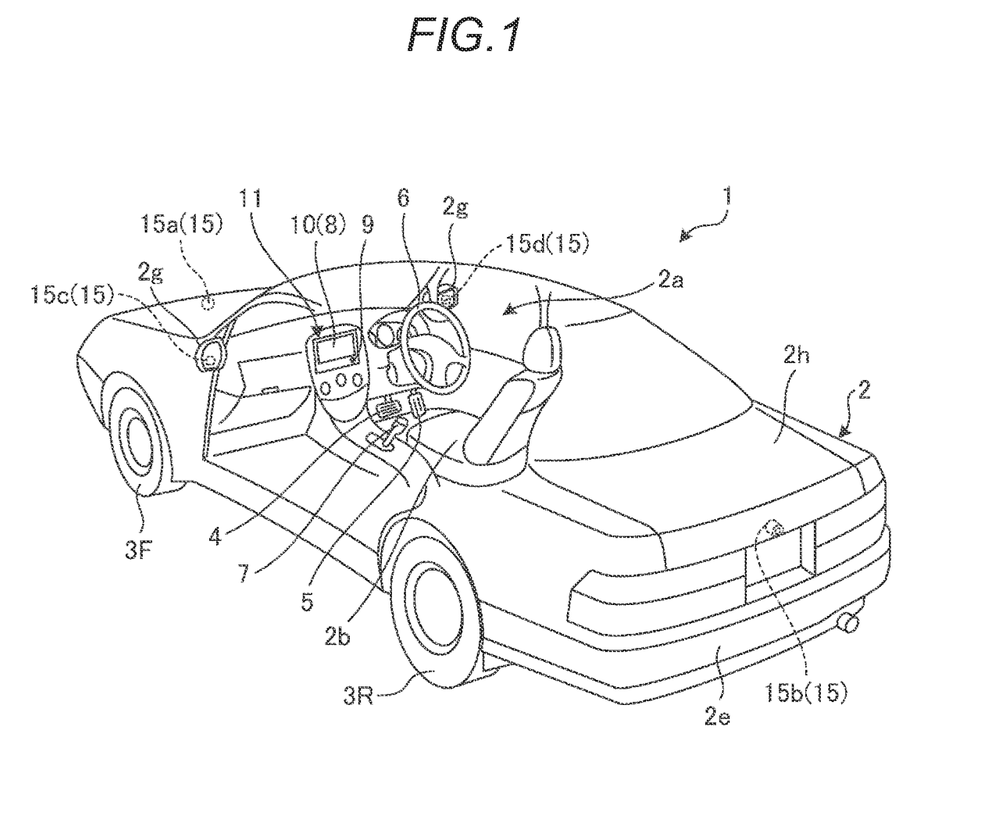
FIG. 1 is an exemplary and schematic view illustrating a configuration of a passenger compartment of a vehicle according to an embodiment.
Figure 2:
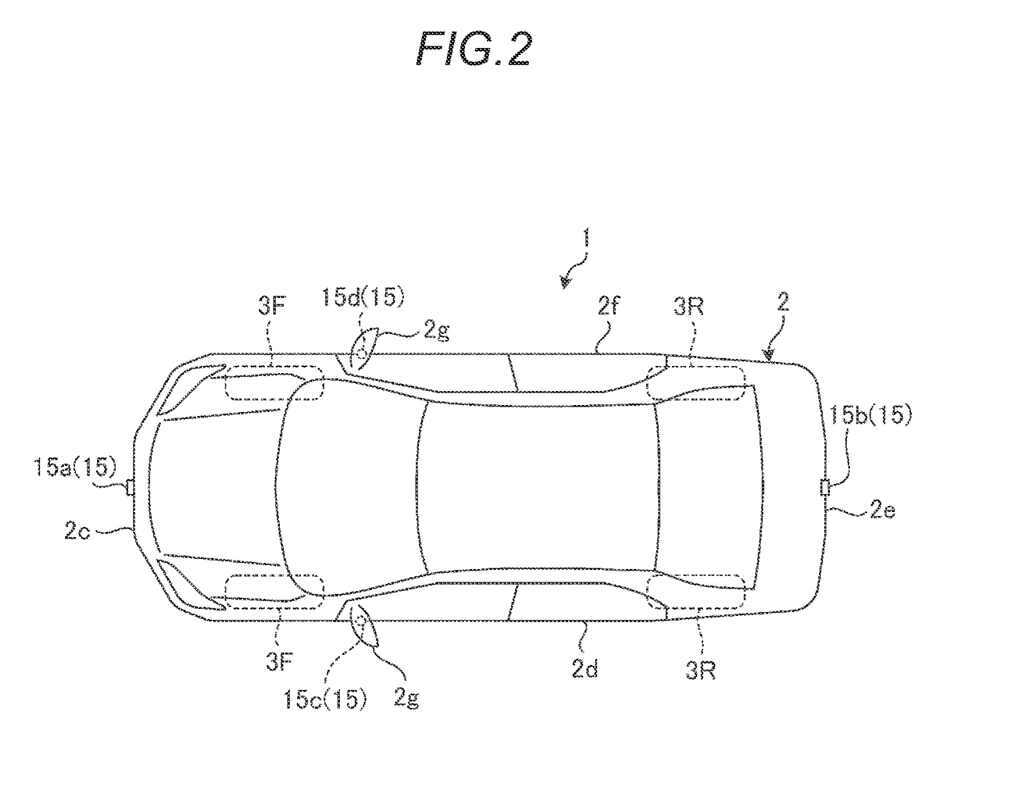
FIG. 2 is an exemplary and schematic view illustrating the appearance of the vehicle according to the embodiment as viewed from above.

First, a schematic configuration of a vehicle 1 according to an embodiment will be described with reference to FIGS. 1 and 2. FIG. 1 is an exemplary and schematic view illustrating a configuration of a passenger compartment 2a of the vehicle 1 according to the embodiment, and FIG. 2 is an exemplary and schematic view illustrating the appearance of the vehicle 1 according to the embodiment as viewed from above.

As illustrated in FIG. 1, the vehicle 1 according to the embodiment includes the passenger compartment 2a in which occupants including a driver as a user get. In the passenger compartment 2a, a brake operation unit 4, an acceleration operation unit 5, a steering operation unit 6, a speed change operation unit 7, and the like are provided to be operable from a seat 2b by the user.

The brake operation unit 4 is an operation input device that receives an operation input of the driver to a brake mechanism that generates braking force in the vehicle 1, and the acceleration operation unit 5 is an operation input device that receives an operation input of the driver to an acceleration mechanism that generates acceleration force in the vehicle 1. In addition, the steering operation unit 6 is an operation input device that receives an operation input of the driver to a steering mechanism that steers a steering wheel of the vehicle 1, and the speed change operation unit 7 is an operation input device that receives an operation input of the driver to a speed changer mechanism that switches the gear ratio of the vehicle 1.

For example, in the example illustrated in FIG. 1, the brake operation unit 4 is a brake pedal provided under the foot of the driver, and the acceleration operation unit 5 is an accelerator pedal provided under the foot of the driver. In addition, the steering operation unit 6 is a steering wheel protruding from a dashboard (instrument panel), and the speed change operation unit 7 is a shift lever protruding from a center console.

In the passenger compartment 2a, a monitor device 11 is provided which includes a display unit 8 that can output various images, and an audio output unit 9 that can output various sounds. The monitor device 11 is provided, for example, in a central portion in a width direction (right-left direction) of the dashboard in the passenger compartment 2a. The display unit 8 is formed of, for example, a liquid crystal display (LCD), an organic electroluminescent display (OELD), or the like.

Here, an operation input unit 10 is provided on a display screen as an area in which an image is displayed in the display unit 8. The operation input unit 10 is formed of a touch panel that can detect the coordinates of a position to which an indicator such as a finger or a stylus gets close (including contact). Accordingly, the user (driver) can visually recognize an image displayed on the display screen of the display unit 8, and can perform a touch (tap) operation using the indicator on the operation input unit 10 to execute various operation inputs.

In the embodiment, the operation input unit 10 may be various physical interfaces such as a switch, a dial, a joystick, and a push button. In addition, in the embodiment, another audio output device may be provided at a position different from the position of the monitor device 11 in the passenger compartment 2a. In this case, various sound information can be output from both the audio output unit 9 and the another audio output device. In addition, in the embodiment, the monitor device 11 may be configured to be able to display information regarding various systems such as a navigation system and an audio system.

In addition, as illustrated in FIGS. 1 and 2, the vehicle 1 according to the embodiment is a four-wheeled car including two right and left front vehicle wheels 3F and two right and left rear vehicle wheels 3R. In the following description, for the sake of simplicity, the front vehicle wheels 3F and the rear vehicle wheels 3R may be collectively referred to as vehicle wheels. In the embodiment, the sideslip angles of a part or all of the four vehicle wheels change (steer) according to the operation of a steering unit 303a or the like.

In addition, a plurality (four in the example illustrated in FIGS. 1 and 2) of in-vehicle cameras 15a to 15d are mounted in the vehicle 1 as imaging units for periphery monitoring. The in-vehicle camera 15a is provided in a rear end portion 2e of a vehicle body 2 (for example, below a door 2h of a rear trunk) to capture an image of an area behind the vehicle 1. In addition, the in-vehicle camera 15b is provided in a side mirror 2g of a right end portion 2f of the vehicle body 2 to capture an image of an area on a right side of the vehicle 1. In addition, the in-vehicle camera 15c is provided in a front end portion 2c (for example, front bumper) of the vehicle body 2 to capture an image of an area in front of the vehicle 1. In addition, the in-vehicle camera 15d is provided in the side mirror 2g of a left end portion 2d of the vehicle body 2 to capture an image of an area on a left side of the vehicle 1. In the following description, when there is no particular need to distinguish therebetween, the in-vehicle cameras 15a to 15d may be referred to simply as an in-vehicle camera 15.

The in-vehicle camera 15 is, for example, a so-called digital camera including an imaging sensor such as a charge-coupled device (CCD) or a complementary metal oxide semiconductor (CMOS) imaging sensor (CIS). The in-vehicle camera 15 captures images of surroundings around the vehicle 1 at a predetermined frame rate to output image data of the captured images obtained by the imaging. The image data obtained by the in-vehicle camera 15 can also form video as frame images.

Next, a system configuration provided to realize various controls in the vehicle 1 according to the embodiment will be described with reference to FIG. 3. The system configuration illustrated in FIG. 3 is merely one example, and thus can be set (changed) in various manners.

Figure 3:
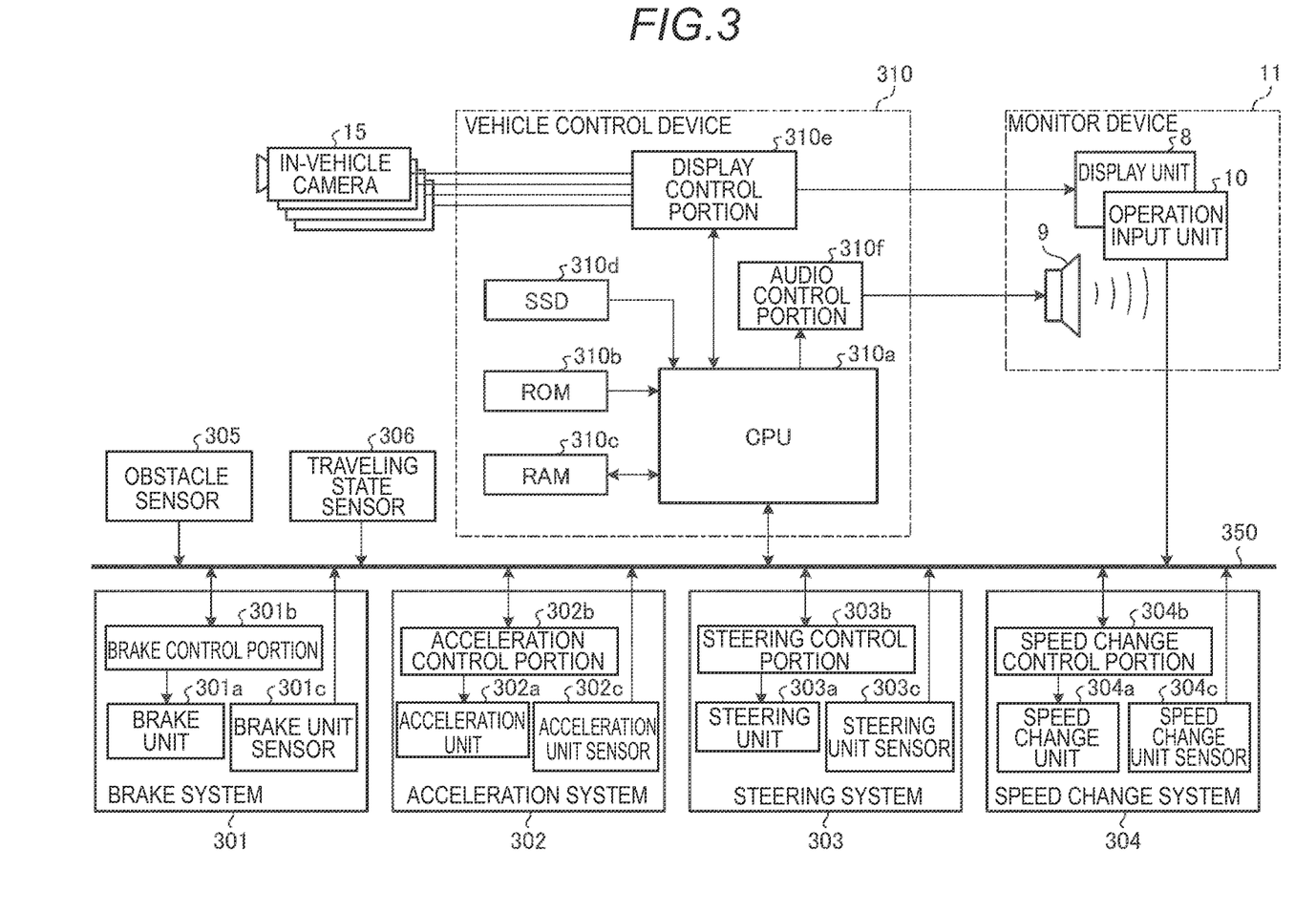
FIG. 3 is an exemplary and schematic block diagram illustrating a system configuration of the vehicle according to the embodiment.

FIG. 3 is an exemplary and schematic block diagram illustrating the system configuration of the vehicle 1 according to the embodiment.

As illustrated in FIG. 3, the vehicle 1 according to the embodiment includes a brake system 301, an acceleration system 302, a steering system 303, a speed change system 304, an obstacle sensor 305, a traveling state sensor 306, the in-vehicle camera 15, the monitor device 11, a vehicle control device 310, and an in-vehicle network 350.

The brake system 301 controls the deceleration of the vehicle 1. The brake system 301 includes a brake unit 301a, a brake control portion 301b, and a brake unit sensor 301c.

The brake unit 301a is, for example, an actuator that drives the brake mechanism of the vehicle 1. The brake unit 301a may operate in a form of assisting the operation of the brake operation unit 4, or may operate separately from the operation on the brake operation unit 4.

The brake control portion 301b is formed of, for example, a microcomputer including a hardware processor such as a central processing unit (CPU). The brake control portion 301b controls the degree of deceleration of the vehicle 1, for example, by causing the brake unit 301a to operate according to an instruction input via the in-vehicle network 350.

The brake unit sensor 301c is a sensing device that detects the state of the brake unit 301a (and the brake operation unit 4). The result of detection by the brake unit sensor 301c is output to the in-vehicle network 350 to be used in each device on the in-vehicle network 350.

The acceleration system 302 controls the acceleration of the vehicle 1. The acceleration system 302 includes an acceleration unit 302a, an acceleration control portion 302b, and an acceleration unit sensor 302c.

The acceleration unit 302a is, for example, an actuator that drives the acceleration mechanism of the vehicle 1. The acceleration unit 302a may operate in a form of assisting the operation of the acceleration operation unit 5, or may operate separately from the operation on the acceleration operation unit 5.

The acceleration control portion 302b is formed of, for example, a microcomputer including a hardware processor such as a CPU. The acceleration control portion 302b controls the degree of acceleration of the vehicle 1, for example, by causing the acceleration unit 302a to operate according to an instruction input via the in-vehicle network 350.

The acceleration unit sensor 302c is a sensing device that detects the state of the acceleration unit 302a (and the acceleration operation unit 5). The result of detection by the acceleration unit sensor 302c is output to the in-vehicle network 350 to be used in each device on the in-vehicle network 350.

The steering system 303 controls an advancing direction of the vehicle 1. The steering system 303 includes the steering unit 303a, a steering control portion 303b, and a steering unit sensor 303c.

The steering unit 303a is, for example, an actuator that drives the steering mechanism of the vehicle 1. The steering unit 303a may operate in a form of assisting the operation of the steering operation unit 6, or may operate separately from the operation on the steering operation unit 6.

The steering control portion 303b is formed of, for example, a microcomputer including a hardware processor such as a CPU. The steering control portion 303b controls the advancing direction of the vehicle 1, for example, by causing the steering unit 303a to operate according to an instruction input via the in-vehicle network 350.

The steering unit sensor 303c is a sensing device that detects the state of the steering unit 303a (and the steering operation unit 6). The result of detection by the steering unit sensor 303c is output to the in-vehicle network 350 to be used in each device on the in-vehicle network 350.

The speed change system 304 controls the gear ratio of the vehicle 1. The speed change system 304 includes a speed change unit 304a, a speed change control portion 304b, and a speed change unit sensor 304c.

The speed change unit 304a is, for example, an actuator that drives the speed changer mechanism of the vehicle 1. The speed change unit 304a may operate in a form of assisting the operation of the speed change operation unit 7, or may operate separately from the operation on the speed change operation unit 7.

The speed change control portion 304b is formed of, for example, a computer including a hardware processor such as a CPU. The speed change control portion 304b controls the gear ratio of the vehicle 1, for example, by causing the speed change unit 304a to operate according to an instruction input via the in-vehicle network 350.

The speed change unit sensor 304c is a sensing device that detects the state of the speed change unit 304a (and the speed change operation unit 7). The result of detection by the speed change unit sensor 304c is output to the in-vehicle network 350 to be usable in each device on the in-vehicle network 350.

The obstacle sensor 305 is a sensing device that detects information regarding an object (obstacle) which may exist around the vehicle 1. The obstacle sensor 305 includes, for example, a distance measurement sensor that acquires a distance to an object existing around the vehicle 1. As the distance measurement sensor, for example, a sonar that transmits sound waves and receives the sound waves reflected by an object, which exists around the vehicle 1, to acquire a distance to the object, a laser radar that transmits radio waves such as light and receives the radio waves reflected by an object, which exists around the vehicle 1, to acquire a distance to the object, or the like is used. The result of detection by the obstacle sensor 305 is output to the in-vehicle network 350 to be usable in each device on the in-vehicle network 350.

The traveling state sensor 306 is a device that detects the traveling state of the vehicle 1. The traveling state sensor 306 includes, for example, a vehicle wheel sensor that detects the vehicle wheel speed of the vehicle 1, an acceleration sensor that detects the acceleration of the vehicle 1 in a front-rear direction or in the right-left direction, a gyro sensor that detects the turning speed (angular speed) of the vehicle 1, or the like. The result of detection by the traveling state sensor 306 is output to the in-vehicle network 350 to be usable in each device on the in-vehicle network 350.

The vehicle control device 310 is formed of, for example, an electronic control unit (ECU) that realizes various functions by comprehensively controlling various systems provided in the vehicle 1. Although will be described in detail later, the vehicle control device 310 according to the embodiment realizes an exiting assistance function to assist exiting of the vehicle 1 from a parking area.

The vehicle control device 310 includes a CPU 310a, a read-only memory (ROM) 310b, a random access memory (RAM) 310c, a solid-state drive (SSD) 310d, a display control portion 310e, and an audio control portion 310f.

The CPU 310a is a hardware processor that comprehensively controls the vehicle control device 310. The CPU 310a reads out various control programs (computer programs) stored in the ROM 310b and the like to realize various functions according to instructions specified in the various control programs. The various control programs referred to here include an exiting assistance program to realize the above-described exiting assistance function.

The ROM 310b is a non-volatile main storage device that stores parameters and the like required to execute the above-described various control programs.

The RAM 310c is a volatile main storage device that provides a working area for the CPU 310a.

The SSD 310d is a rewritable non-volatile auxiliary storage device. In the vehicle control device 310 according to the embodiment, instead of the SSD 310d (or in addition to the SSD 310d), a hard disk drive (HDD) may be provided as an auxiliary storage device.

The display control portion 310e mainly performs image processing on the captured images acquired from the in-vehicle camera 15, the generation of image data to be output to the display unit 8 of the monitor device 11, or the like among various processes that can be executed by the vehicle control device 310.

The audio control portion 310f mainly performs the generation of audio data to be output to the audio output unit 9 of the monitor device 11 among the various processes that can be executed by the vehicle control device 310.

The in-vehicle network 350 communicably connects the brake system 301, the acceleration system 302, the steering system 303, the speed change system 304, the obstacle sensor 305, the traveling state sensor 306, the operation input unit 10 of the monitor device 11, and the vehicle control device 310 to each other.

By the way, in the related art, when the above-described exiting assistance function is realized, a technique has been known by which an exit path is calculated based on information regarding an obstacle existing on the periphery. In such a technique of the related art, for example, as in the following comparative example illustrated in FIG. 4, a passage direction in which and a passage connected to an exit of a parking area extends and a vehicle has to travel after exiting from the parking area may be detected with reference to other vehicles as obstacles existing in adjacent parking areas, and an exit path may be calculated based on the passage direction.

Figure 4:
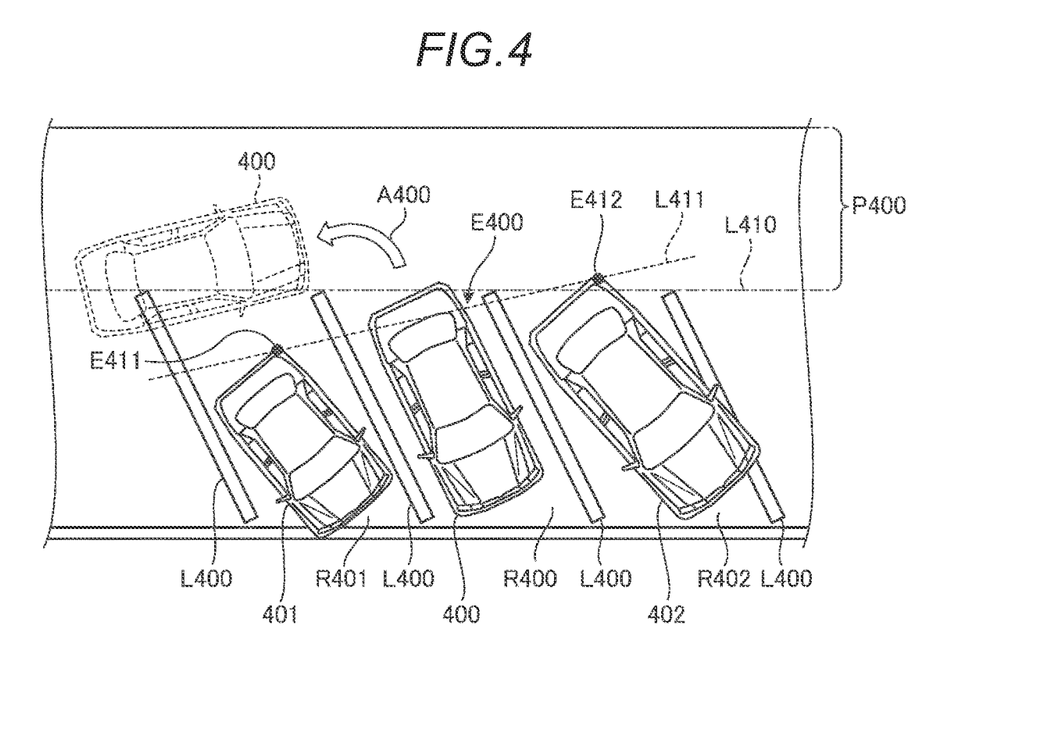
FIG. 4 is an exemplary and schematic view illustrating one example of exiting assistance according to a comparative example.

FIG. 4 is an exemplary and schematic view illustrating one example of exiting assistance according to the comparative example.

As illustrated in FIG. 4, in the comparative example, the above-described technique of the related art is used to assist a vehicle 400 in traveling backward to exit from an exit E400 of an area R400, the vehicle 400 being parked in the area R400 at the center among areas R400 to R402 as parking areas that are adjacent to each other and partitioned by white lines L400 as partition lines. More specifically, in the comparative example, the direction in which a straight line L411 passing through an end portion E411 of a vehicle 401 parked in the area R401 and an end portion E412 of a vehicle 402 parked in the area R402 extends is detected as a passage direction, an exit path is calculated as illustrated by an arrow A400 based on the detected passage direction, and exiting of the vehicle 400 along the calculated exit path is assisted.

However, as illustrated in FIG. 4, a straight line indicating an extending direction of an actual passage P400 on which the vehicle 400 actually has to travel after exiting from the area R400 is a straight line L410 deviated from the straight line L411. The deviation is due to the fact that the sizes, the shapes, the parking methods, or the like of other vehicles 401 and 402 are not always consistent. Therefore, in the example illustrated in FIG. 4, the passage direction deviated from an actual passage direction is detected. The passage direction does not necessarily coincide with an advancing direction of the vehicle 400, and when the passage direction deviated from the actual passage direction is detected, an inappropriate exit path as illustrated by the arrow A400 is calculated which causes the entry of the vehicle 400 into another parking area.

As described above, since the sizes, the shapes, the parking methods, or the like of other vehicles as obstacles existing in adjacent parking areas are not always consistent, as in the above-described technique of the related art, when the passage direction is detected with reference to the other vehicles, an appropriate passage direction may not be calculated.

Figure 5:
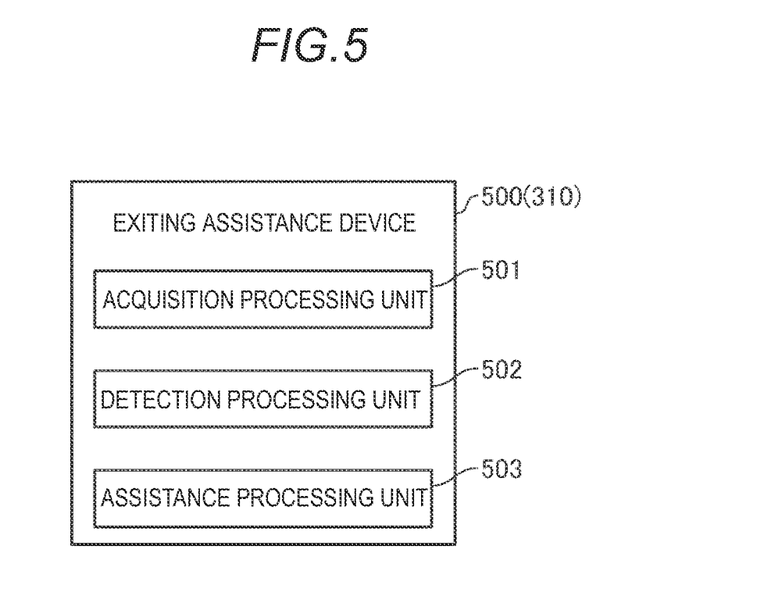
FIG. 5 is an exemplary and schematic block diagram illustrating the function of an exiting assistance device according to the embodiment.

Therefore, in the embodiment, the calculation of an appropriate passage direction is realized by realizing an exiting assistance device 500 having the following function illustrated in FIG. 5 in the vehicle control device 310. The exiting assistance device 500 is one example of a "passage direction detecting device".

FIG. 5 is an exemplary and schematic block diagram illustrating the function of the exiting assistance device 500 according to the embodiment.

The function illustrated in FIG. 5 is realized in the vehicle control device 310 by cooperation of software and hardware. Namely, the function illustrated in FIG. 5 is realized as a result of the reading out and executing of a predetermined control program (exiting assistance program), which is stored in the ROM 310b or the like, by the CPU 310a of the vehicle control device 310. In the embodiment, at least a part of the function illustrated in FIG. 5 may be realized by dedicated hardware (circuit).

As illustrated in FIG. 5, the exiting assistance device 500 according to the embodiment includes an acquisition processing unit 501, a detection processing unit 502, and an assistance processing unit 503.

The acquisition processing unit 501 acquires a captured image from the in-vehicle camera 15. More specifically, the acquisition processing unit 501 acquires a captured image that portrays a road surface including a road surface marking provided on the road surface to indicate the parking area of the vehicle 1. The road surface marking is, for example, a partition line such as the white line L400 (refer to FIG. 4) described above, but the technique of the embodiment can also be applied to road surface markings of other forms (specific examples will be described later).

The detection processing unit 502 executes image recognition processing on the captured image acquired by the acquisition processing unit 501 to detect the road surface marking from the captured image. Then, the detection processing unit 502 detects a passage direction in which a passage connected to an exit of the parking area extends and the vehicle 1 has to travel after exiting from the parking area, based on the road surface marking detected from the captured image.

The assistance processing unit 503 calculates an exit path that the vehicle 1 has to follow when exiting from the parking area, based on the passage direction detected by the detection processing unit 502, to execute an assistance process to assist exiting of the vehicle 1 along the exit path.

In the embodiment, the assistance process may be executed as a process to realize automatic driving or semi-automatic driving of the vehicle 1 using one or more of the brake system 301, the acceleration system 302, the steering system 303, and the speed change system 304 illustrated in FIG. 3, or may be executed as a process to cause the monitor device 11 or the like to output an image or audio for guiding a drive operation when it is assumed that a driver manually performs the drive operation.

Hereinafter, the exiting assistance according to the embodiment will be described more specifically with reference to FIGS. 6 to 8.

Figure 6:
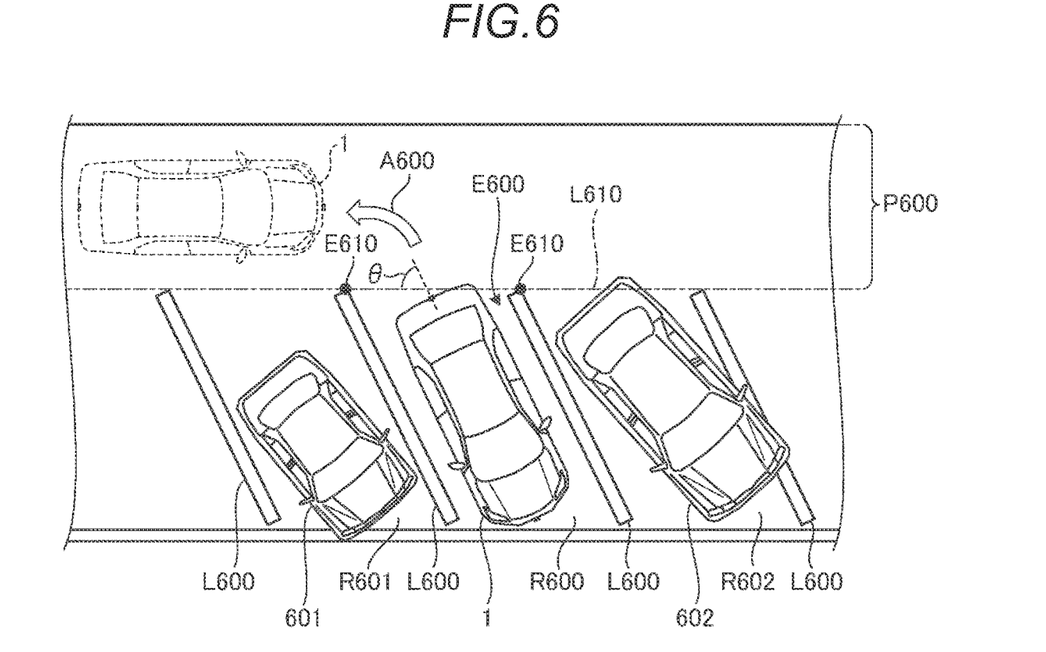
FIG. 6 is an exemplary and schematic view illustrating one example of exiting assistance according to the embodiment.

FIG. 6 is an exemplary and schematic view illustrating one example of the exiting assistance according to the embodiment.

As illustrated in FIG. 6, the exiting assistance according to the embodiment is executed in a situation where the vehicle 1 travels backward to exit from an exit E600 of an area R600, the vehicle 1 being parked in the area R600 at the center among areas R600 to R602 as parking areas that are adjacent to each other and partitioned by white lines L600 each having an elongated rectangular shape. The white line L600 is a partition line extending in a direction intersecting a passage P600.

In the embodiment, first, the detection processing unit 502 performs a white line detection process as the image recognition processing of the captured image to detect the positions of end portions E610 of two white lines L600 that partition the area R600, the end portions E610 corresponding to both ends of the exit E600. Then, the detection processing unit 502 detects a straight line L610, which passes through the positions of the end portions E610, as a passage direction.

In the example illustrated in FIG. 6, a straight line indicating an extending direction of the actual passage P600 on which the vehicle 1 actually has to travel after exiting from the area R600 coincides with the straight line L610. Therefore, according to the embodiment, an appropriate passage direction can be detected.

Namely, in the embodiment, unlike the above-described comparative example in which the passage direction is detected with reference to the other vehicles 401 and 402 that are not limited to a case in which the sizes, the shapes, the parking methods, or the like are always consistent, the passage direction is detected with reference to the white line L600 of which the position does not change.

Then, in the embodiment, the direction of the vehicle 1 is detected to specify the front-rear direction of the vehicle 1 in the parking area R600, and exiting assistance is executed based on an angle θ between the front-rear direction and the passage direction detected with reference to the white line L600. In the example illustrated in FIG. 6, the white line L600 is formed straight along right and left end portions of the vehicle 1 during parking in the parking area R600. For this reason, in the embodiment, an extending direction of the white line L600 formed straight may be detected, and an angle between the extending direction of the white line L600 and the passage direction may be obtained as the angle θ.

As described above, according to the embodiment, an appropriate passage direction coinciding with the extending direction of the actual passage P600 can be detected, and as a result, appropriate assistance of exiting along an arrow A600 can be executed without causing the entry of the vehicle 1 into another parking area.

Figure 7:
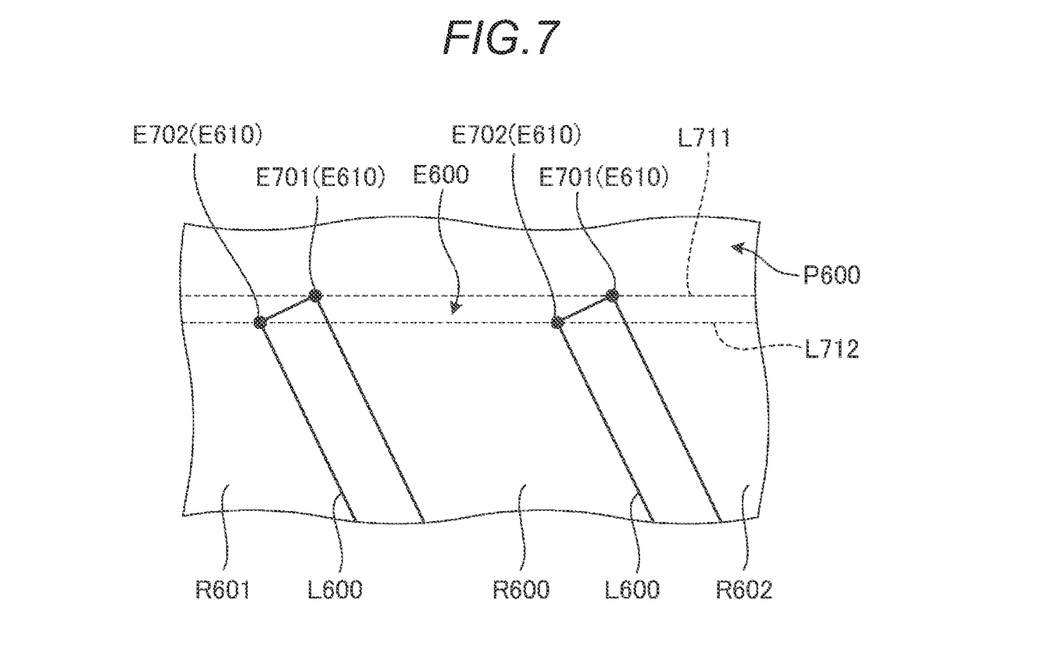
FIG. 7 is an exemplary and schematic view illustrating in more detail a method for detecting a passage direction and a method for calculating an exit path according to the embodiment.

More specifically, in the embodiment, the detection of the passage direction and the calculation of the exit path are executed by the following method illustrated in FIG. 7.

FIG. 7 is an exemplary and schematic view illustrating in more detail a method for detecting a passage direction and a method for calculating an exit path according to the embodiment. FIG. 7 corresponds to an enlarged view of only an area in the vicinity of the end portions E610 of the white lines L600 that partition the area R600 in the example illustrated in FIG. 6.

As illustrated in FIG. 7, when the white line L600 having an elongated rectangular shape is provided in a diagonal direction that is inclined with respect to a direction orthogonal to the passage P600, an end portion E601 on an exit E600 side of the white line L600 includes two types of end portions, specifically, an end portion E701 close to the passage P600 and an end portion E702 far from the passage P600.

Since it can be said that both a straight line L711 passing through the end portions E701 of two white lines L600 and a straight line L712 passing through the end portions E702 are straight lines indicating the passage direction, in the case of consideration of only the detection of the passage direction, it can be said that no particular problem occurs even when either of the straight lines L711 and L712 is adopted as the passage direction. However, when the calculation of the exit path is also taken into consideration, it may be reasonable not to adopt the straight line L712 but adopt the straight line L711.

More specifically, the straight line L711 is located closer to a parking area side than the straight line L712. Therefore, it can be said that an exit path which is calculated to guide the vehicle 1 not to enter the parking area side from the straight line L711 has a lower possibility to cause the entry of the vehicle 1 into another parking area than an exit path which is calculated to guide the vehicle 1 not to enter the parking area side from the straight line L712. Therefore, in the embodiment, the detection of the passage direction and the calculation of the exit path are executed based on the straight line L711 specified with reference to the end portions E701 close to the passage P600.

As described above, in the embodiment, the detection processing unit 502 detects positions corresponding to both ends of an exit of a parking area, based on a road surface marking detected by the image recognition processing of a captured image acquired by the acquisition processing unit 501, to detect an extending direction of a straight line, which passes through the positions corresponding to both ends, as a passage direction. Then, the assistance processing unit 503 calculates an exit path that guides the vehicle 1, which has exited from the exit of the parking area, not to enter a parking area side from the straight line passing through the positions corresponding to both ends of the exit of the parking area.

By the way, the detection of the passage direction and the calculation of the exit path can be executed as a series of processes at the start of exiting; however, in the embodiment, as illustrated below in FIG. 8, it is also assumed that the detection of a passage direction is executed in advance at the time of parking and only the calculation of an exit path is executed at the start of exiting.

Figure 8:
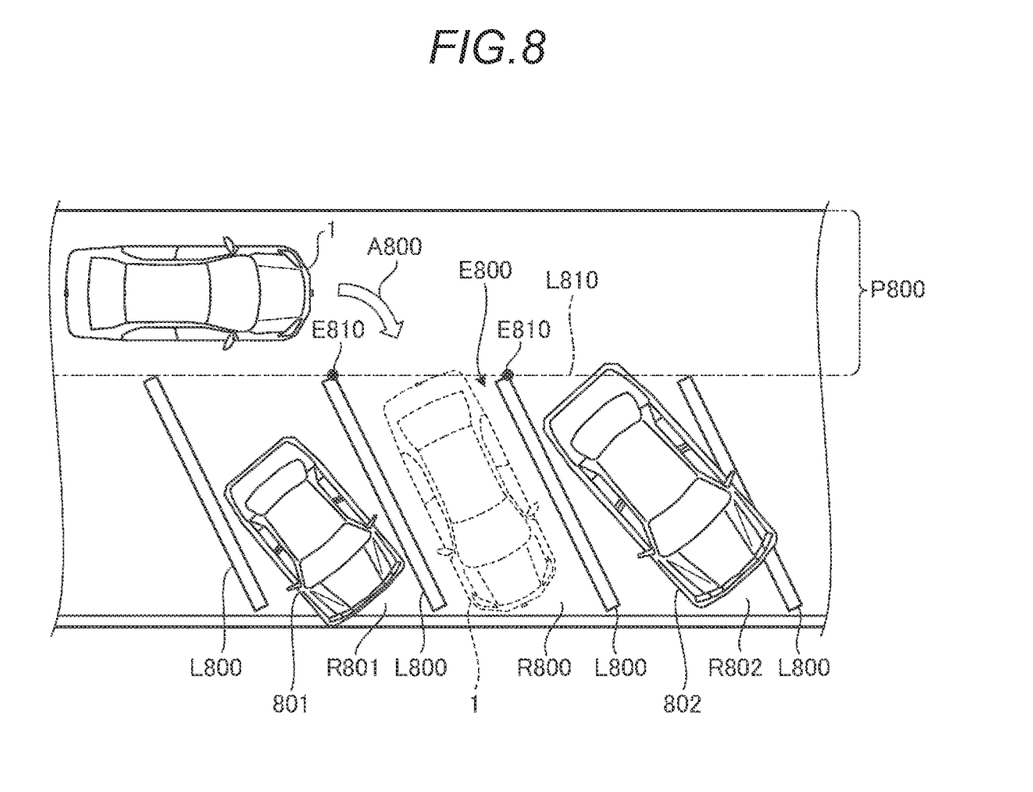
FIG. 8 is an exemplary and schematic view illustrating one example of the timing of detection of the passage direction according to the embodiment.

FIG. 8 is an exemplary and schematic view illustrating one example of the timing of detection of the passage direction according to the embodiment.

As illustrated in FIG. 8, in the embodiment, the detection processing unit 502 can detect the passage direction in advance in a situation where the vehicle 1 is to be parked along an arrow A800 in an area R800 at the center among areas R800 to R802 as parking areas that are adjacent to each other and partitioned by white lines L800. Even in this situation, the positions of end portions E810 of the white lines L800 that partition the area R800 in which the vehicle 1 has to be parked can be detected as positions, which correspond to both ends of an exit E800 of the area R800, by the image recognition processing of a captured image, and an extending direction of a straight line L810 passing through the end portions E810 can be detected as the passage direction.

Here, when parking is completed, in many cases, an ignition of the vehicle 1 is turned off, and the ignition of the vehicle 1 is turned on at the timing when the next exiting starts. Therefore, in order to use the passage direction, which is detected in advance when the vehicle 1 is parked, at the start of exiting again, it is necessary to non-volatilely store the passage direction regardless of whether the ignition of the vehicle 1 is turned on or off.

Therefore, in the embodiment, the detection processing unit 502 can detect a passage direction at the time of parking in a parking area and stores the detected passage direction in a non-volatile storage device such as the SSD 301*d* and the ROM 310*b* before the ignition of the vehicle 1 is turned off. Then, after the ignition of the vehicle 1 is turned on at the time of exiting from the parking area, the assistance processing unit 503 can read out the passage direction from the non-volatile storage devices, calculate an exit path based on the read-out passage direction, and execute exiting assistance.

For example, the exiting assistance device 500 according to the embodiment executes a process in the following flow illustrated in FIGS. 9 and 10 based on the above configuration.

Figure 9:
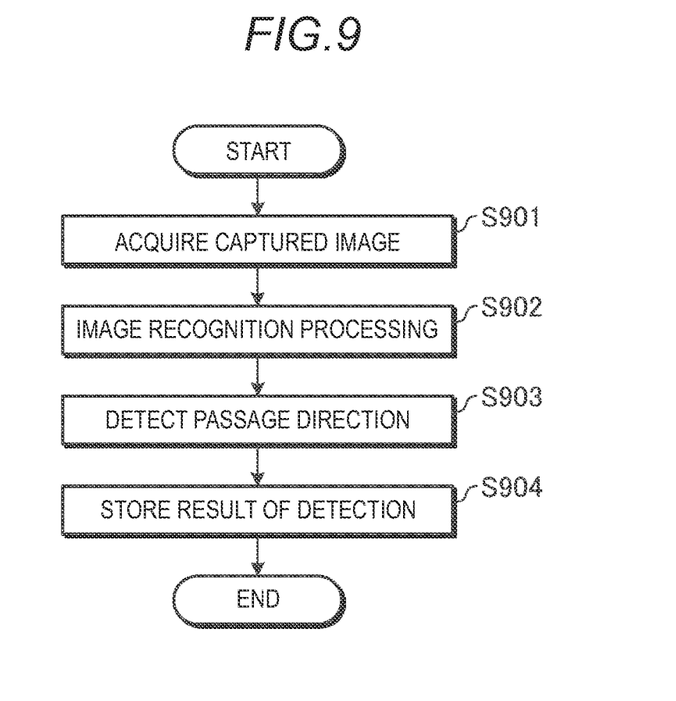
FIG. 9 is an exemplary flowchart illustrating one example of a process executed by the exiting assistance device when the vehicle is parked in a parking area according to the embodiment.

FIG. 9 is an exemplary flowchart illustrating one example of the process executed by the exiting assistance device 500 when the vehicle 1 is parked in a parking area according to the embodiment.

As illustrated in FIG. 9, in the embodiment, first, in S901, the acquisition processing unit 501 of the exiting assistance device 500 acquires a captured image, which portrays a road surface, from the in-vehicle camera 15.

Then, in S902, the detection processing unit 502 of the exiting assistance device 500 executes image recognition processing on the captured image acquired in S901 to detect a road surface marking portrayed in the captured image. For example, when the road surface marking is formed of partition lines extending in a direction intersecting a passage, the detection processing unit 502 detects the positions of end portions of two partition lines, which partition a parking area in which the vehicle 1 is to be parked, as positions corresponding to both ends of an exit of the parking area.

Then, in S903, the detection processing unit 502 detects a passage direction based on the result of detection of the road surface marking in S902. For example, when the positions of the end portions of the two partition lines described above are detected as the positions corresponding to both ends of the exit of the parking area in S902, the detection processing unit 502 detects a straight line, which passes through the positions of the end portions of the two partition lines, as a passage direction.

Then, in S904, the detection processing unit 502 stores the result of detection of the passage direction in the non-volatile storage device such as the SSD 301d and the ROM 310b in S903. The result of detection stored here is used in the following process at the time of exiting illustrated in FIG. 10. Then, the process ends.

Figure 10:
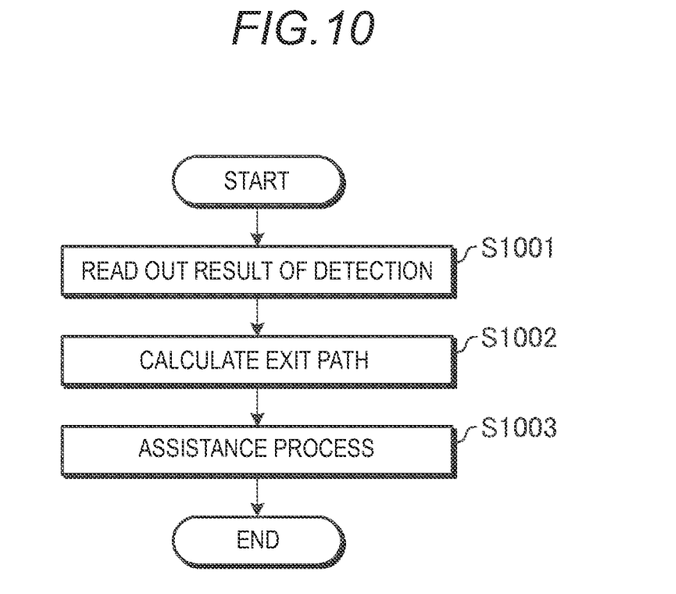
FIG. 10 is an exemplary flowchart illustrating one example of a process executed by the exiting assistance device when the vehicle exits from the parking area according to the embodiment.

FIG. 10 is an exemplary flowchart illustrating one example of the process executed by the exiting assistance device 500 when the vehicle 1 exits from a parking area according to the embodiment. The process illustrated in FIG. 10 starts, for example, when the ignition of the vehicle 1 is turned on at the time of exiting.

As illustrated in FIG. 10, in the embodiment, first, in S1001, the assistance processing unit 503 of the exiting assistance device 500 reads out the result of detection of the passage direction stored in the non-volatile storage devices in S904 (refer to FIG. 9).

Then, in S1002, the assistance processing unit 503 calculates an exit path that the vehicle 1 has to follow at the time of exiting, based on the passage direction read out in S1001. For example, when the passage direction is detected based on a straight line passing through the positions corresponding to both ends of the exit of the parking area, the assistance processing unit 503 calculates an exit path that guides the vehicle 1 not to protrude to a parking area side from the straight line.

Then, in S1003, the assistance processing unit 503 executes an assistance process to assist exiting of the vehicle 1 along the exit path calculated in S1002. Then, the process ends. As described above, in the embodiment, the assistance process may be executed as a process to realize automatic driving or semi-automatic driving of the vehicle 1 using one or more of the brake system 301, the acceleration system 302, the steering system 303, and the speed change system 304 illustrated in FIG. 3, or may be executed as a process to cause the monitor device 11 or the like to output an image or audio for guiding a drive operation when it is assumed that a driver manually performs the drive operation.

As described above, in the embodiment, the detection of the passage direction and the calculation of the exit path may be executed as a series of processes when the vehicle 1 starts to exit. In this case, the flowchart of FIG. 10 executed at the time of exiting is of a form in which the processes of S901 to S903 of FIG. 9 are executed instead of the process of S1001.

As described above, the exiting assistance device 500 according to the embodiment includes the detection processing unit 502 and the assistance processing unit 503. The detection processing unit 502 detects a passage direction in which a passage connected to an exit of a parking area extends and the vehicle 1 has to travel after exiting from the parking area, based on a road surface marking provided on a road surface to illustrate the parking area of the vehicle 1. The assistance processing unit 503 calculates an exit path that the vehicle 1 has to follow when exiting from the parking area, based on the passage direction detected by the detection processing unit 502, to execute an assistance process to assist exiting of the vehicle 1 along the exit path.

In the exiting assistance device 500 according to the embodiment, an appropriate passage direction can be detected with reference to a road surface marking of which the position does not change, and an appropriate exit path can be calculated based on the appropriate passage direction.

More specifically, in the embodiment, the detection processing unit 502 detects positions corresponding to both ends of an exit of a parking area, based on a road surface marking, to detect an extending direction of a straight line passing through the positions corresponding to both ends, as a passage direction. Then, the assistance processing unit 503 calculates an exit path that guides the vehicle, which has exited from the exit of the parking area, not to enter a parking area side from the straight line. According to such a configuration, the detection of the passage direction and the calculation of the exit path can be appropriately executed based on the result of detection of the positions corresponding to both ends of the exit of the parking area.

In addition, in the embodiment, the detection processing unit 502 can detect a passage direction at the time of parking in a parking area and store the detected passage direction in the non-volatile storage device such as the SSD 301d and the ROM 310b before the ignition of the vehicle 1 is turned off. Then, after the ignition of the vehicle 1 is turned on at the time of exiting from the parking area, the assistance processing unit 503 can read out the passage direction from the non-volatile storage devices, calculate an exit path based on the read-out passage direction, and execute exiting assistance. According to such a configuration, the detection of the passage direction is not required at the time of exiting, so that exiting can be more quickly started.

In addition, in the embodiment, the assistance processing unit 503 can execute exiting assistance based on an angle (θ illustrated in FIG. 6) between the front-rear direction of the vehicle 1 in the parking area and the passage direction. According to such a configuration, appropriate exiting assistance can be executed based on the angle obtained by using the passage direction. In the embodiment, when the road surface marking includes a straight line along the right and left end portions of the vehicle 1 during parking in the parking area, the assistance processing unit 503 may execute exiting assistance based on an angle between an extending direction of the straight line and the passage direction.

The exiting assistance program executed in the vehicle control device 310 according to the embodiment may be provided or distributed via a network such as the Internet. Namely, the exiting assistance program executed by the vehicle control device 310 according to the embodiment may be provided in a form of downloading via a network such as the Internet in a state where the exiting assistance program is stored in a computer connected to the network.

Modification Example

In the above-described embodiment, the partition line extending in a direction intersecting a passage is provided as one example of the road surface marking. However, the technique disclosed here can also be applied to the following road surface markings of other forms as illustrated in FIGS. 11 to 14.

Figure 11:
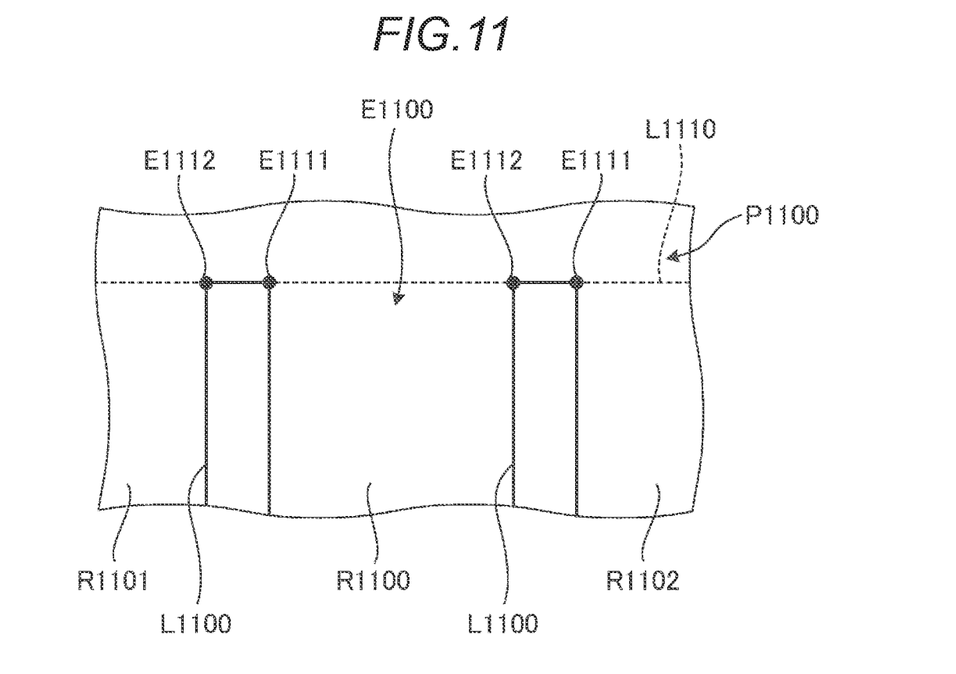
FIG. 11 is an exemplary and schematic view illustrating one example of a road surface marking according to a modification example.

FIG. 11 is an exemplary and schematic diagram illustrating one example of a road surface marking according to a modification example.

In the modification example illustrated in FIG. 11, as one example of a form different from the partition line as a road surface marking in the above-described embodiment, white lines L1100 are provided which each have an elongated rectangular shape and partition an area R1100 as a parking area from areas R1101 and R1102 as other parking areas by extending in a direction that is orthogonal to a passage P1100 connected to an exit E1100 of the area R1100. A passage direction indicating the direction of the passage P1100 can be appropriately detected from the white lines L1100 and the exit path can be appropriately calculated by the same approach as that in the above-described embodiment.

Namely, in the modification example illustrated in FIG. 11, when the passage direction is detected, first, the positions of end portions E1111 or E1112 on a passage P1100 side of two white lines L1100 which partition the area R1100 are detected as positions corresponding to both ends of the exit E1100 of the area R1100 by the image recognition processing of a captured image. Then, a straight line L1110 passing through the positions of the end portions E1111 or E1112 is detected as a passage direction. Then, the exit path is calculated as a path that guides the vehicle 1, which has exited from the exit E1100, not to enter the side of the areas R1100 to R1102 from the straight line L1110.

As described above, also in the modification example illustrated in FIG. 11, similar to the above-described embodiment, the detection of the passage direction and the calculation of the exit path can be appropriately executed based on the result of detection of the positions corresponding to both ends of the exit E1100 of the area R1100 as a parking area.

In the modification example illustrated in FIG. 11, unlike the above-described embodiment in which the partition lines intersect the passage direction, both the end portions E1111 and E1112 have the same proximity to the passage P1100. Therefore, in this modification example, either of the positions of the end portions E1111 and E1112 may be used as a reference for detecting the passage direction.

Figure 12:
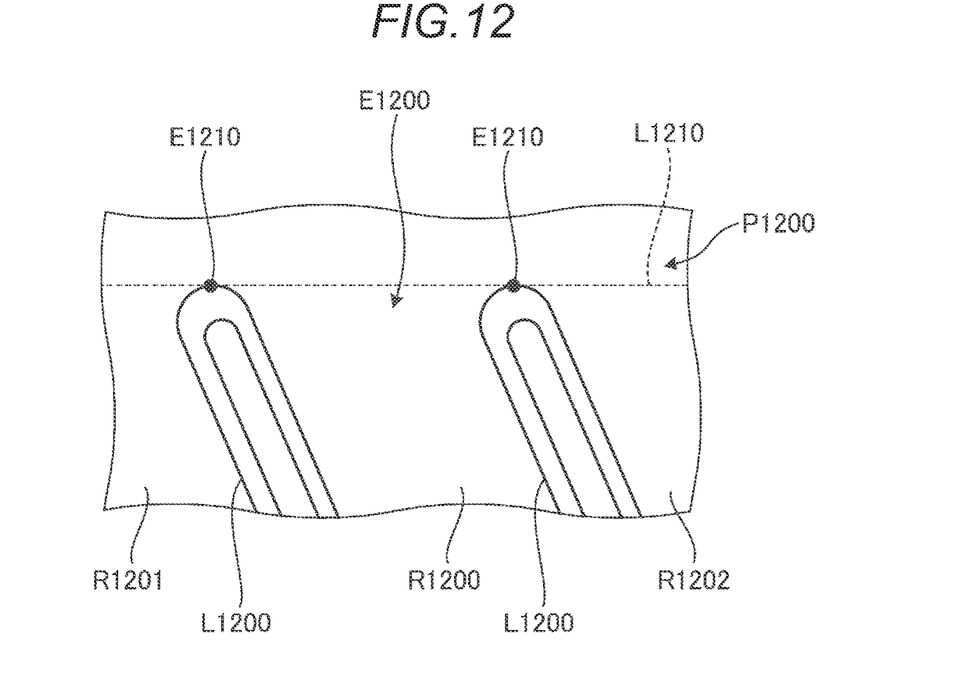
FIG. 12 is an exemplary and schematic view illustrating another example of a road surface marking according to a modification example different from that of FIG. 11.

FIG. 12 is an exemplary and schematic view illustrating another example of a road surface marking according to a modification example different from that of FIG. 11.

In the modification example illustrated in FIG. 12, a white line L1200 having a U-shaped tip is provided as another example of the partition line as a road surface marking. The white line L1200 is configured to partition an area R1200 as a parking area from areas R1201 and R1202 as other parking areas by extending in a diagonal direction that is inclined with respect to a direction orthogonal to a passage P1200 connected to an exit E1200 of the area R1200. A passage direction indicating the direction of the passage P1200 can be appropriately detected from the white lines L1200 and the exit path can be appropriately calculated by the same approach as that in the above-described embodiment.

Namely, in the modification example illustrated in FIG. 12, when the passage direction is detected, first, the positions of end portions E1210 on a passage P1200 side of two white lines L1200 which partition the area R1200 are detected as positions corresponding to both ends of the exit E1200 of the area R1200.by image recognition processing of a captured image. Then, a straight line L1210 passing through the positions of the end portions E1210 is detected as a passage direction. Then, the exit path is calculated as a path that guides the vehicle 1, which has exited from the exit E1200, not to enter the side of the areas R1200 to R1202 from the straight line L1210.

As described above, also in the modification example illustrated in FIG. 12, similar to the above-described embodiment, the detection of the passage direction and the calculation of the exit path can be appropriately executed based on the result of detection of the positions corresponding to both ends of the exit E1200 of the area R1200 as a parking area.

Figure 13:
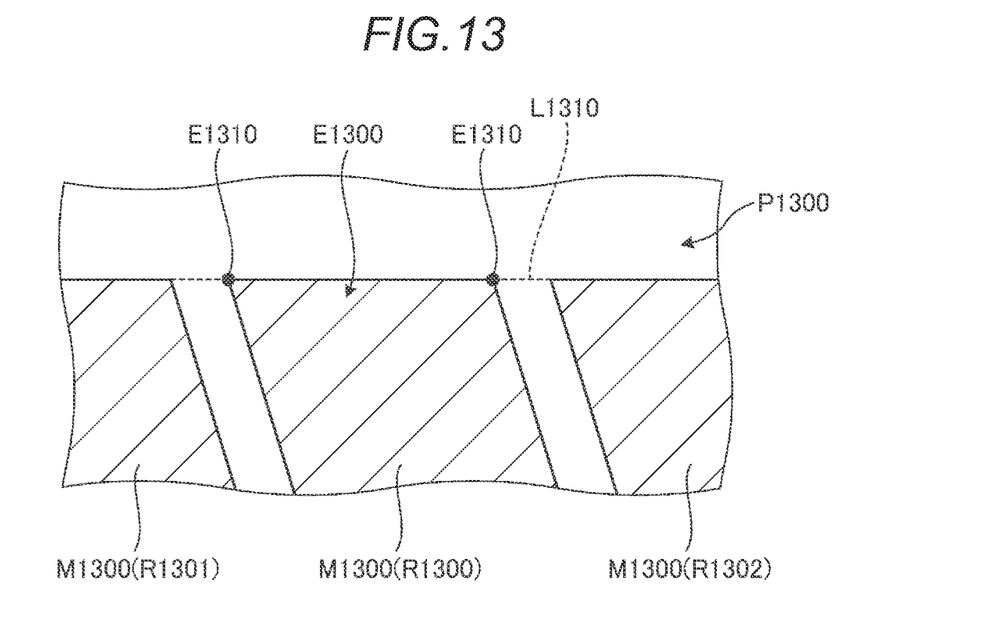
FIG. 13 is an exemplary and schematic view illustrating another example of a road surface marking according to a modification example different from those of FIGS. 11 and 12.

FIG. 13 is an exemplary and schematic view illustrating another example of a road surface marking according to a modification example different from those of FIGS. 11 and 12.

In the modification example illustrated in FIG. 13, as one example of a road surface marking other than the partition line, a colored area M1300 is provided which is formed by painting areas R1300, R1301, and R1302 as parking areas with a color different from that of a road surface. The colored area M1300 may be such that the entirety of the parking area is colored or only a part of the parking area is colored as long as the outer shape of the parking area (particularly, both ends of an exit) can be recognized. A passage direction indicating the direction of a passage P1300 connected to an exit E1300 of the area R1300 can be appropriately detected from the colored area M1300 and the exit path can be appropriately calculated by the same approach as that in the above-described embodiment.

Namely, in the modification example illustrated in FIG. 13, when the passage direction is detected, first, the positions of end portions E1310 on a passage P1300 side of the colored area M1300 are detected as positions corresponding to both ends of the exit E1300 of the area R1300 by the image recognition processing of a captured image. Then, a straight line L1310 passing through the positions of the end portions E1310 is detected as a passage direction. Then, the exit path is calculated as a path that guides the vehicle 1, which has exited from the exit E1300, not to enter the side of the areas R1300 to R1302 from the straight line L1310.

As described above, also in the modification example illustrated in FIG. 13, similar to the above-described embodiment, the detection of the passage direction and the calculation of the exit path can be appropriately executed based on the result of detection of the positions corresponding to both ends of the exit E1300 of the area R1300 as a parking area.

Figure 14:
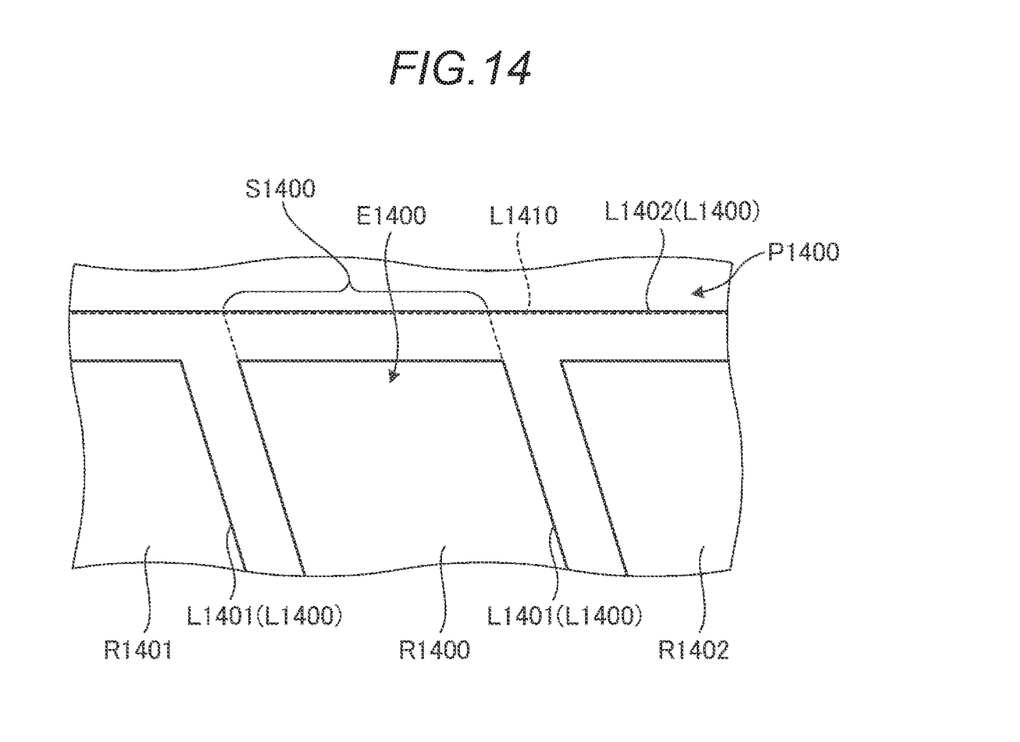
FIG. 14 is an exemplary and schematic view illustrating another example of a road surface marking according to a modification example different from those of FIGS. 11 to 13.

FIG. 14 is an exemplary and schematic view illustrating another example of a road surface marking according to a modification example different from those of FIGS. 11 to 13.

In the modification example illustrated in FIG. 14, as still another example of the partition line as a road surface marking, a white line L1400 is provided which further includes a white line L1402 in addition to white lines L1401 that partition an area R1400 as a parking area from areas R1401 and R1402 as other parking areas, the white line L1402 extending in the same direction as that of a passage P1400 on an exit E1400 side of the area R1400. A passage direction indicating the direction of the passage P1400 can be appropriately detected from the white line L1400 and the exit path can be appropriately calculated by an approach that is not the same as but similar to that in the above-described embodiment.

Namely, in the modification example illustrated in FIG. 14, when the passage direction is detected, first, a line segment S1400 indicating the exit E1400 of the area R1400 is detected by the image recognition processing of a captured image. Then, an extending direction of the line segment S1400 is detected as the passage direction. Then, the exit path is calculated as a path that guides the vehicle 1, which has exited from the exit E1400, not to enter the side of the areas R1400 to R1402 from a straight line L1410 along the line segment S1400.

As described above, according to the modification example illustrated in FIG. 14, the detection of the passage direction and the calculation of the exit path can be appropriately executed based on the result of detection of the line segment S1400 corresponding to the exit E1400 of the area R1400.

In addition, the passage direction detected in the above-described embodiment can be used not only to provide assistance of exiting but also to visually notify an occupant of the vehicle 1 as in the following modification example illustrated in FIG. 15.

Figure 15:
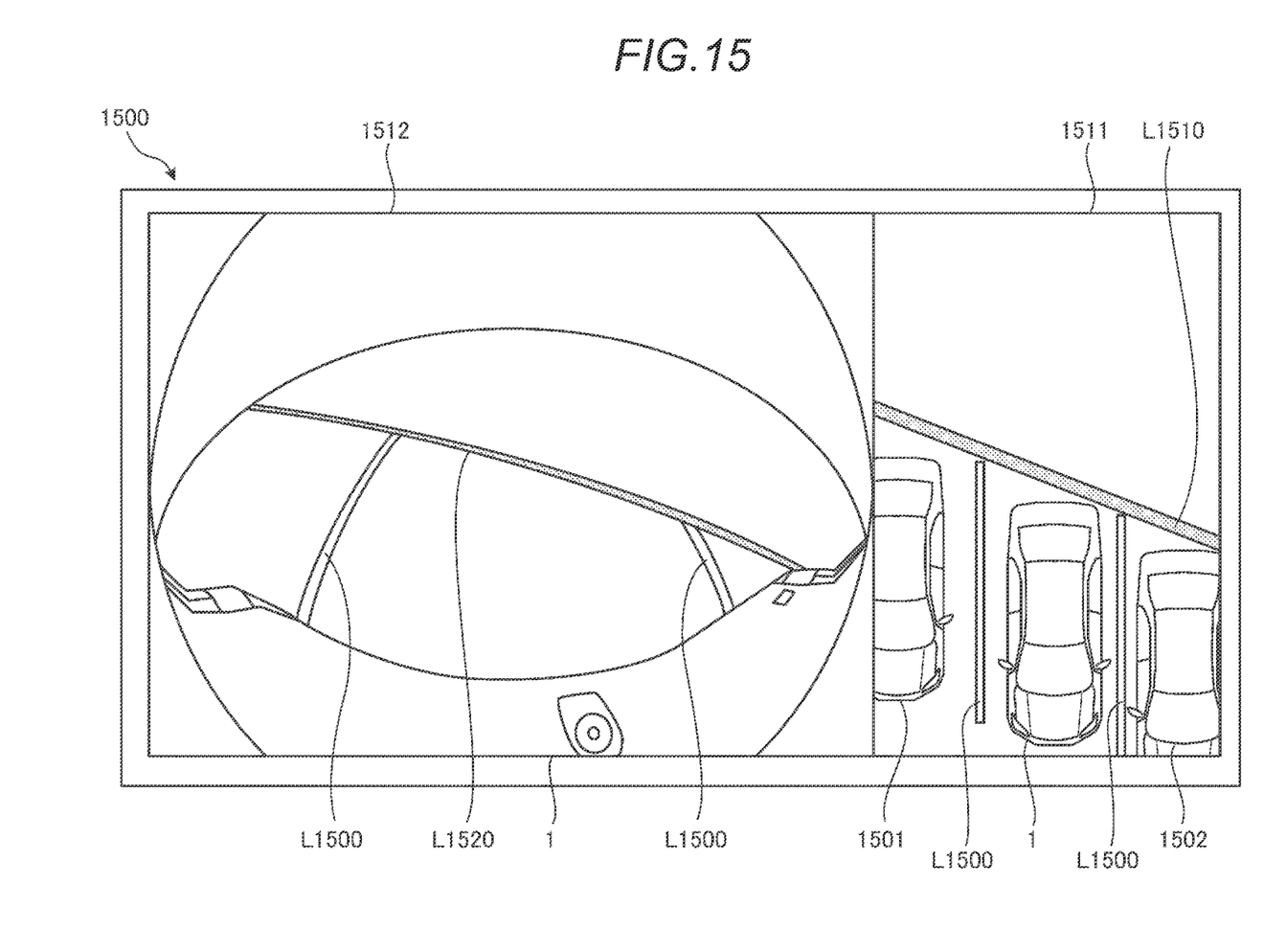
FIG. 15 is an exemplary and schematic view illustrating one example of a method for visually notifying a passage direction in a modification example.

FIG. 15 is an exemplary and schematic view illustrating one example of a method for visually notifying a passage direction in a modification example.

An image 1500 illustrated in FIG. 15 is displayed, for example, on the display unit 8 (refer to FIG. 3) of the vehicle 1. The display of the image 1500 on the display unit 8 can be executed under control of a display processing unit (not illustrated) that can be realized as one function of the exiting assistance device 500 (refer to FIG. 5) as one example of the passage direction detecting device. The display processing unit may be realized as a function separate from the function module group illustrated in FIG. 5, or may be included as one function of the assistance processing unit 503 (refer to FIG. 5). Namely, the display of the image 1500 on the display unit 8 may be executed as a part of exiting assistance by the assistance processing unit 503.

As illustrated in FIG. 15, the image 1500 includes a bird's-eye view image 1511 which is generated based on the result of capturing of images by the in-vehicle cameras 15*a* to 15*d* (refer to FIGS. 2 and 3) and in which a situation of the periphery of the vehicle 1 is depicted in the point of view from above, and a rear image 1512 obtained from the in-vehicle camera 15*d* (refer to FIG. 2) which captures an image of a situation behind the vehicle 1.

In the example illustrated in FIG. 15, the passage direction detected by the detection processing unit 502 is displayed in both the bird's-eye view image 1511 and the rear image 1512. More specifically, the bird's-eye view image 1511 displays the vehicle 1, other vehicles 1501 and 1502 which are parked in parallel on the right and left sides of the vehicle 1, white lines L1500 which partition the parking area of the vehicle 1, and a marking L1510 which is a straight line and illustrates the passage direction, which is detected with reference to the white lines L1500 by the same method as that in the above-described embodiment, in the point of view of the bird's-eye view image 1511. In addition, the rear image 1512 also displays the white lines L1500 which partition the parking area of the vehicle 1, and a marking L1520 which is a straight line and illustrates the passage direction, which is detected with reference to the white lines L1500 by the same method as that in the above-described embodiment, in the point of view of the rear image 1512.

According to the example illustrated in FIG. 15, the passage direction can be visually and easily recognized by looking at the display unit 8.

In the above description, the painting of a road surface such as a white line and a colored area is provided as an example of the road surface marking. However, in this disclosure, the road surface marking includes not only two-dimensional markings such as the painting of a road surface but also three-dimensional markings such as blocks, planting, and strings as long as the markings are provided on the road surface to illustrate the parking area of the vehicle.

A passage direction detecting device as an aspect of this disclosure includes: a detection processing unit that detects a passage direction in which a passage connected to an exit of a parking area of a vehicle extends and the vehicle has to travel after exiting from the parking area, based on a road surface marking provided on a road surface to illustrate the parking area.

According to the passage direction detecting device described above, an appropriate passage direction can be detected with reference to the road surface marking of which the position does not change.

In the passage direction detecting device described above, the detection processing unit may detect positions corresponding to both ends of the exit of the parking area, based on the road surface marking, to detect an extending direction of a straight line, which passes through the positions corresponding to both the ends, as the passage direction. According to such a configuration, an appropriate passage direction can be detected based on the result of detection of the positions corresponding to both the ends of the exit of the parking area.

In addition, in the passage direction detecting device described above, the detection processing unit may detect a line segment corresponding to the exit of the parking area, based on the road surface marking, to detect an extending direction of the line segment as the passage direction, and an assistance processing unit may calculate an exit path that guides the vehicle, which has exited from the exit of the parking area, not to enter a parking area side from the line segment. According to such a configuration, an appropriate passage direction can be detected based on the result of detection of line segment corresponding to the exit of the parking area.

In addition, in the passage direction detecting device described above, the detection processing unit may detect the passage direction at a time of parking in the parking area and store the detected passage direction in a non-volatile storage device before an ignition of the vehicle is turned off. According to such a configuration, for example, the passage direction stored in the non-volatile storage device can be used when the ignition of the vehicle is turned on again according to exiting.

The passage direction detecting device described above may further include an assistance processing unit that executes an assistance process to assist exiting of the vehicle from the parking area based on the passage direction detected by the detection processing unit. According to such a configuration, exiting of the vehicle can be appropriately assisted based on an appropriate passage direction.

In this case, the assistance processing unit may execute the exiting assistance based on an angle between a front-rear direction of the vehicle in the parking area and the passage direction, or when the road surface marking includes a straight line along right and left end portions of the vehicle parking in the parking area, based on an angle between an extending direction of the straight line and the passage direction. According to such a configuration, appropriate exiting assistance can be executed based on the angle obtained by using the passage direction.

In addition, in the passage direction detecting device described above, the detection processing unit may detect the passage direction based on the road surface marking detected by image recognition processing of a captured image obtained by capturing an image of the road surface marking that is a partition line partitioning the parking area or a colored area formed by painting at least a part of the parking area with a color different from a color of the road surface. According to such a configuration, an appropriate passage direction can be easily detected based on the partition lines or the colored area detected by the image recognition processing.

In addition, the passage direction detecting device described above may further include a display processing unit that outputs a marking, which indicates the passage direction detected by the detection processing unit, to a display unit together with a situation around the vehicle. According to such a configuration, the passage direction can be visually and easily recognized by looking at the display unit.

The embodiment and the modification examples of this disclosure have described above; however, the embodiment and the modification examples described above are merely examples and are not intended to limit the scope of this disclosure. The embodiment and the modification examples described above can be implemented in various forms, and various omissions, replacements, or changes can be made without departing from the concept of this disclosure. The embodiment and the modification examples described above are included in the scope and the concept of this disclosure, and are included in this disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A passage direction detecting device comprising:
    at least one camera configured to capture images of a road surface including a road surface marking;
    a detector that receives the captured images and only uses the road surface marking portion of the capture images to detect a passage direction in which a passage connected to an exit of a parking area of a vehicle extends and the vehicle has to travel after exiting from the parking area, using only the road surface marking provided on a road surface captured by the at least one camera to illustrate the parking area;
    an assistance processor that executes an assistance process to assist exiting of the vehicle from the parking area based on the passage direction detected by the detector,
    wherein the assistance processor controls at least one of braking, speed or steering of the vehicle,
    wherein the detector detects positions corresponding to both ends of the exit of the parking area, based on only the road surface marking from the capture image, to detect an extending direction of a straight line, which passes through the positions corresponding to both the ends, as the passage direction.

2. The passage direction detecting device according to claim 1, wherein
    the detector detects the straight line as a line segment corresponding to the exit of the parking area, based on the road surface marking, to detect an extending direction of the line segment as the passage direction.

3. The passage direction detecting device according to claim 1, wherein
    the detector detects the passage direction at a time of parking in the parking area and stores the detected passage direction in a non-volatile storage device before an ignition of the vehicle is turned off.

4. The passage direction detecting device according to claim 1, wherein
    the assistance processor executes the exiting assistance based on an angle between a front-rear direction of the vehicle in the parking area and the passage direction, or when the road surface marking includes a straight line along right and left end portions of the vehicle parking in the parking area, based on an angle between an extending direction of the straight line and the passage direction.

5. The passage direction detecting device according to claim 1, wherein
    the detector detects the passage direction based on the road surface marking detected by image recognition processing of a captured image obtained by capturing an image of the road surface marking that is a partition line partitioning the parking area or a colored area formed by painting at least a part of the parking area with a color different from a color of the road surface.

6. The passage direction detecting device according to claim 1, further comprising:
    a display processor that outputs a marking, which indicates the passage direction detected by the detector, to a display together with a situation around the vehicle.

* * * * *